United States Patent
Sun

(10) Patent No.: US 7,865,050 B1
(45) Date of Patent: Jan. 4, 2011

(54) EQUALIZING MODAL DELAY OF HIGH ORDER MODES IN BEND INSENSITIVE MULTIMODE FIBER

(75) Inventor: Yi Sun, Suwanee, GA (US)

(73) Assignee: OFS Fitel, LLC, Norcross, GA (US)

( * ) Notice: Subject to any disclaimer, the term of this patent is extended or adjusted under 35 U.S.C. 154(b) by 0 days.

(21) Appl. No.: 12/658,804

(22) Filed: Feb. 16, 2010

(51) Int. Cl.
   G02B 6/028 (2006.01)
   G02B 6/036 (2006.01)
   G02B 6/10 (2006.01)
(52) U.S. Cl. .................... 385/123; 385/127; 385/130
(58) Field of Classification Search ............. 385/124, 385/130, 131, 133, 123, 125, 126, 127, 128, 385/141–145; 359/161, 173, 179, 189, 191; 372/6; 374/137
   See application file for complete search history.

(56) References Cited

U.S. PATENT DOCUMENTS

| | | | | |
|---|---|---|---|---|
| 3,904,268 A * | 9/1975 | Keck et al. ................. 385/124 |
| 3,909,110 A * | 9/1975 | Marcuse ................... 385/28 |
| 4,057,320 A * | 11/1977 | Marcatili .................. 385/124 |
| 4,691,990 A * | 9/1987 | Cohen et al. .............. 385/127 |
| 4,770,492 A * | 9/1988 | Levin et al. ............... 385/13 |
| 4,877,304 A * | 10/1989 | Bhagavatula .............. 385/124 |
| 5,852,690 A * | 12/1998 | Haggans et al. ........... 385/37 |
| 6,292,612 B1 | 9/2001 | Golowich et al. |
| 6,317,549 B1 * | 11/2001 | Brown ...................... 385/123 |
| 6,442,320 B1 * | 8/2002 | Danziger et al. .......... 385/123 |
| 6,594,429 B1 * | 7/2003 | White ....................... 385/124 |
| 6,633,715 B2 * | 10/2003 | Knudsen et al. .......... 385/127 |
| 7,409,128 B2 * | 8/2008 | Holcomb et al. .......... 385/115 |
| 7,760,771 B2 * | 7/2010 | Salokatve et al. ......... 372/6 |
| 2006/0010921 A1 * | 1/2006 | Mori et al. ................ 65/393 |
| 2007/0003196 A1 * | 1/2007 | Holcomb et al. .......... 385/115 |
| 2008/0166094 A1 | 7/2008 | Bookbinder et al. |
| 2009/0060438 A1 * | 3/2009 | Mori et al. ................ 385/127 |
| 2009/0154888 A1 | 6/2009 | Abbott, III et al. |
| 2009/0169163 A1 | 7/2009 | Abbott, III et al. |
| 2010/0103978 A1 * | 4/2010 | Lee et al. .................. 374/137 |
| 2010/0177792 A1 * | 7/2010 | Takenaga .................. 372/6 |
| 2010/0178504 A1 * | 7/2010 | Chen et al. ................ 428/391 |

* cited by examiner

*Primary Examiner*—Akm E Ullah
(74) *Attorney, Agent, or Firm*—Law Office of Peter V.D. Wilde; Michael A. Morra

(57) ABSTRACT

Described are multimode optical fibers in which the differential in the mode delay for higher order modes is reduced for bending insensitive MMF. The result is preservation of low differential mode delay and high bandwidth while low bend loss is achieved. The designs are based on choosing a combination of a core profile and a cladding structure with a negative trench positioned at a radius related to the core profile. A feature of the preferred embodiments is a core with a hybrid refractive index profile. The hybrid refractive index profile is essentially a combination of a standard alpha profile and a step profile at the outer edge of the alpha profile.

19 Claims, 7 Drawing Sheets o : small loop bends

EQUALIZING MODAL DELAY OF HIGH ORDER MODES IN BEND INSENSITIVE MULTIMODE FIBER

RELATED APPLICATION

This application is related to application Ser. No. 12/583,212, filed Aug. 17, 2009, which application is incorporated by reference herein in its entirety.

FIELD OF THE INVENTION

This invention relates to multimode optical fibers designed for exceptional bend loss characteristics.

BACKGROUND OF THE INVENTION

The tendency of optical fibers to leak optical energy when bent has been known since the infancy of the technology. It is well known that light follows a straight path but can be guided to some extent by providing a path, even a curved path, of high refractive index material surrounded by material of lower refractive index. However, in practice that principle is limited, and optical fibers often have bends with a curvature that exceeds the ability of the light guide to contain the light.

Controlling transmission characteristics when bent is an issue in nearly every practical optical fiber design. The initial approach, and still a common approach, is to prevent or minimize physical bends in the optical fiber. While this can be largely achieved in long hauls by designing a robust cable, or in shorter hauls by installing the optical fibers in microducts, in all cases the optical fiber must be terminated at each end. Thus even under the most favorable conditions, bending, often severe bending, is encountered at the optical fiber terminals.

Controlling bend loss can also be addressed by the physical design of the optical fiber itself. Thus ring features or trench features, or combinations thereof, are commonly found at the outside of the optical fiber refractive index profiles to control bend losses. See for example, U.S. Pat. Nos. 4,691,990 and 4,852,968, and U.S. patent application Ser. No. 12/583,212, filed Aug. 17, 2009, all incorporated herein by reference.

Bend loss occurs in both single mode and multimode optical fibers. Multimode optical fibers typically are used in communications over shorter distances such as in data centers, enterprise LAN, SAN, etc. The advantage of multimode fiber lies mainly in the ability to couple this fiber with simple and more cost effective sources. In the past these sources were mainly LEDs with the wavelength around 850 nm. Lately, low cost Vertical Cavity Surface Emitting Laser (VCSEL) with vertical resonators have appeared in the market that enable effective coupling between the laser diode and optical fibers. These laser diodes also achieve high modulation rates, e.g., up to 10.3125 Gbps. For 40G/100G in high performance computing, data center and SAN applications, IEEE p802.3ba proposes standards for parallel VCSEL array with individual channel of 10.3125 Gbps, and/or higher speeds up to 25 Gbps, and/or WDM.

Performance issues for optical fibers under bend conditions have generally been considered to involve generalized optical power loss, due to leakage of light from the optical fiber at the location of the bend. In single mode optical fibers general power loss is the primary consideration, because all leakage involves light in the fundamental mode of the optical fiber. However, in multimode optical fiber the modal structure affects the loss, with higher order modes suffering more loss than lower order modes. The combination of higher order and lower order modes in a multimode optical fiber determines the bandwidth, and thus the signal carrying capacity of the optical fiber.

For high bandwidth, the group velocities of the various modes in multimode fibers should be as close to equal as possible. The differential group velocities can be controlled by grading the refractive index of the material comprising the core, which means specifying a functional form of the index as a function of the fiber radius. In a conventional multi-mode fiber, the design goal has been to achieve a α-shape, which is defined as:

$$\frac{n(r) - n_{clad}}{n_{clad}} = \Delta(1 - (r/r_{core})^\alpha), \quad (1)$$

where r is the radius of the fiber, $r_{core}$ is the radius of the core, $n_{clad}$ is the refractive index of the cladding, and α and Δ are free parameters. This is the so-called α-shape profile.

An inherent limitation of the α-shape profile design is that high order modes are not properly compensated due to coupling to cladding modes at the edge of the core. Thus the modal delay of high order modes deviates from low order and medium order modes. For conventional α-shape MMF, such as OM3 and OM4, the differential mode attenuation of high order modes is high, which minimizes impact of high order modes on differential mode delay and eventually bandwidth. OM3 and OM4 are well known MMF performance standards of the Telecommunications Industry Association (TIA). In MMF designed for low bend loss, the same high order modes will have much less differential mode attenuation. Consequently, the impact of differential mode delay on bandwidth cannot be neglected. Thus, method of equalizing modal delay of high order modes are needed for bending insensitive MMF (BIMMF) used in high speed digital transmission. In the current state of the art, high speed transmission for optical data systems is generally considered to be 10 Gbps or greater.

To support high packaging densities anticipated in super-computing applications, new design concepts for optimizing band-width, relaxing tolerances for VCSEL coupling, and reducing bend loss are needed.

STATEMENT OF THE INVENTION

We have designed multimode optical fibers in which the differential in the mode delay for higher order modes is reduced for bending insensitive MMF. The result is preservation of low differential mode delay and high bandwidth while low bend loss is achieved. The designs are based on choosing a combination of a core profile and a cladding structure with a negative trench positioned at a radius related to the core profile. A feature of the preferred embodiments is a core with a hybrid refractive index profile. The hybrid refractive index profile is essentially a combination of a standard alpha profile and a step profile at the outer edge of the alpha profile.

DETAILED DESCRIPTION

Figure 1:
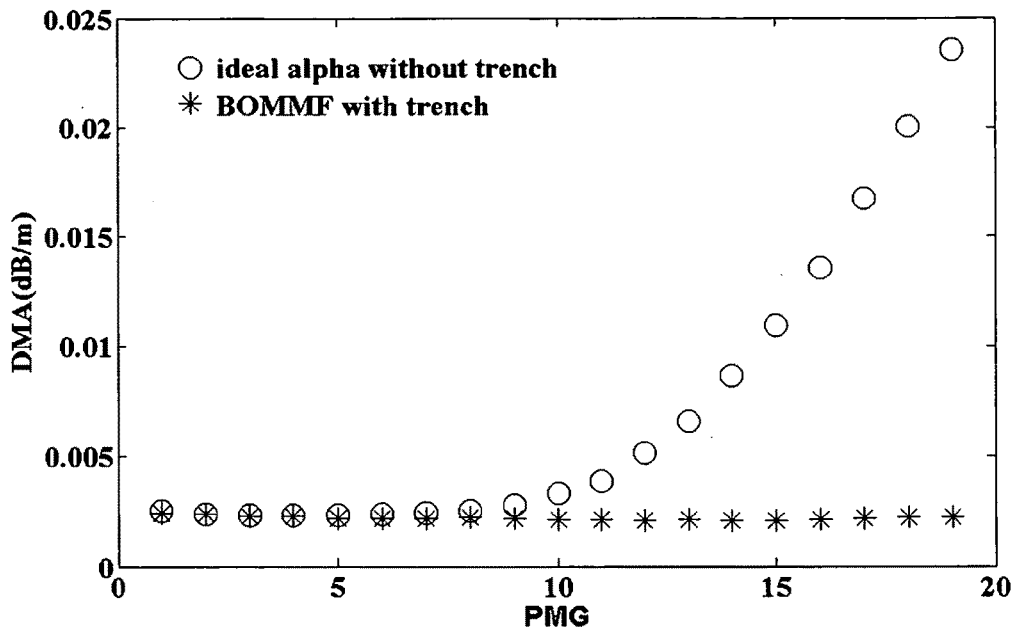
FIG. 1 is a plot showing differential mode attenuation (DMA) in dB/m for a typical BIMMF optical fiber with a trench, and a comparison with a standard optical fiber having an alpha profile but no trench.

With reference to FIG. 1, the differential mode attenuation (DMA) for higher order modes in a α-shape profile design without a trench is compared with the DMA for a BIMMF optical fiber, and shows that higher order modes in the α-shape profile attenuate more. For conventional α-shape MMF, the differential mode attenuation of high order modes is high, which minimizes impact of high order modes on differential mode delay and eventually bandwidth. In MMF designed for low bend loss (trench design), the same high order modes will have much less differential mode attenuation. Thus it has more impact on differential modal delay and bandwidth. The differential modal delay can be reduced by locating the trench correctly and modification of the core profile especially core edge.

Figure 2:
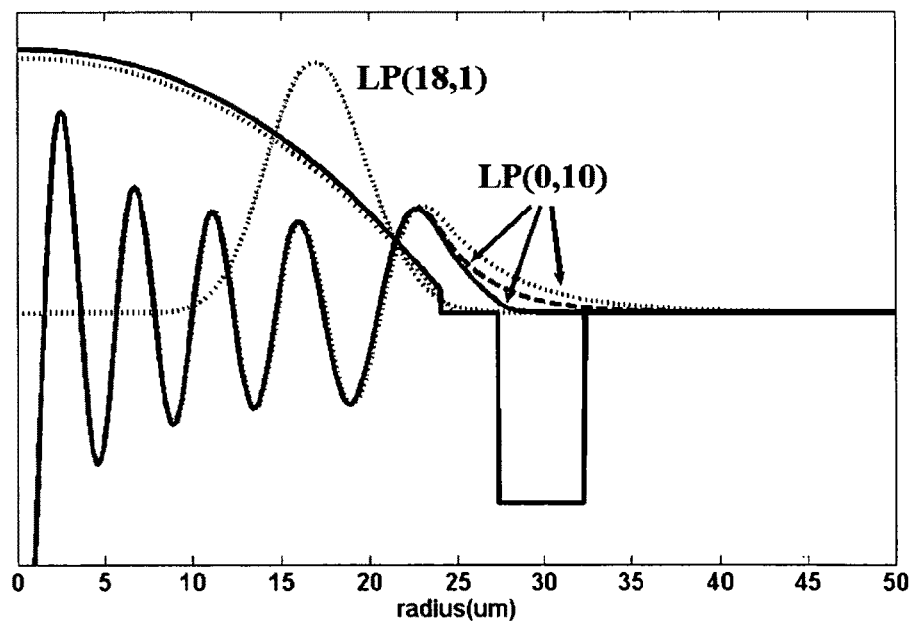
FIG. 2 shows E-field distribution for LP(0,10) and LP(18,1) in a modified core profile with and without a trench comparing to that of an alpha profile without a trench in cladding.

To gain insight, impact on E-field of high order modes by the existence of a trench in cladding and modification of core edge are examined, as shown in FIG. 2. In graded index MMF with 50 μm core and 1.05% delta in core axis the highest principal mode group (PMG) is 19. There are 10 individual (L,P) modes in PMG 19, which are LP(0,10), LP(2,9), LP(4, 8), LP(6,7), LP(8,6), LP(10,5), LP(12,4), LP(14,3), LP(16,2), and LP(18,1). Among these 10 modes, LP(0,10) has the longest evanescent tail spreading into the cladding, while LP(18, 1) has the least coupling with the cladding. Modes coupling to the cladding move faster. As the core edge is modified, the evanescent tail of LP(0,10) shrinks toward core. As a trench with negative index is added, the evanescent tail of the LP(0, 10) shrinks further within the trench region, which indicates less coupling to cladding and slowing down of mode propagation. The evanescent tail of R(r) of LP(18,1), which already sits inside of the core, is not affected as much by the trench.

In a first embodiment of the invention, the optical fiber consists of four regions: (a) a α-shape core with positive index relative to the silica cladding, (b) an annular region next to the core, (c) a trench with negative index next to the annular region, (d) a silica cladding next to the trench. The four regions may be represented as:

$$n(r) - n_{clad} = \Delta\left(1 - \left(\frac{r}{r_{core}}\right)^a\right) \cdot n_{clad} \quad \text{for } r \le r_0 \le r_{core} \quad (2)$$

$$= \Delta_1 \cdot n_{clad} \quad \text{for } r_0 < r \le r_{tr2}$$

$$= \Delta_2 \cdot n_{clad} \quad \text{for } r_{tr1} < r \le r_{tr2}$$

$$= 0 \quad \text{for } r \ge r_{tr2}$$

where n(r) is absolute refractive index at radial position r, $n_{clad}$ is absolute refractive index of cladding, $\Delta$, $\Delta_1$, $\Delta_2$ are relative index difference, r is radial position, $r_{core}$ is core radius, $r_0$ is a position less or equal than $r_{core}$ and α preferably has a value of 1.9 to 2.2. $\Delta_2 \cdot n_{clad}$ is also denoted as the trench DN or $DN_{tr}$.

It has been discovered that, contrary to the idea that the inner wall of the negative index trench needs to be precisely shaped to optimize the modal delay of high order modes, a step trench, having the right depth and placed at the right position, may be used to tailor the modal delay of high order modes. Indeed, it can equalize the modal delay of high order modes, as shown below for several cases of $r_0 = r_{core}$.

Figure 3:
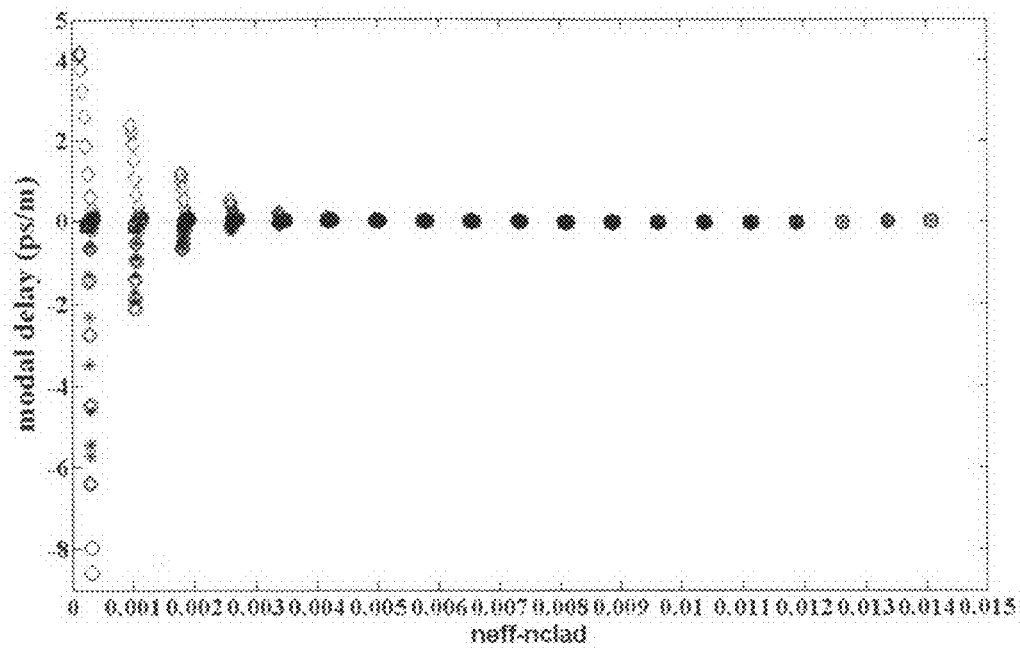
FIG. 3 is a plot of modal delays vs. effective index of all guided modes for a α-shape profile fiber without a trench (circles) and three BIMMF with a trench located at 5 μm (star), 1.5 μm (square), and 0 μm (diamond)
Figure 4:
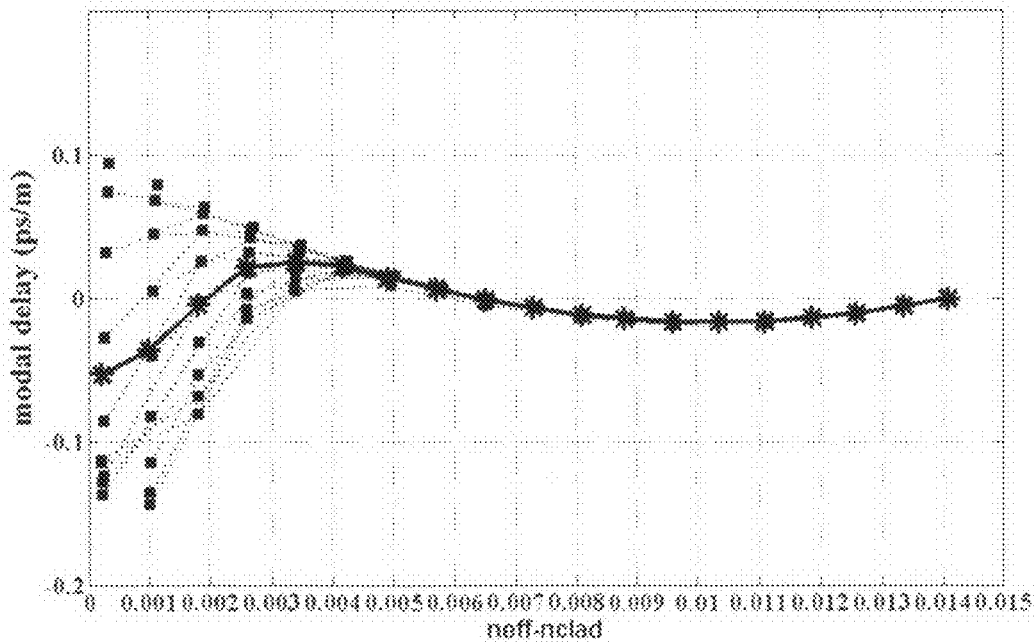
FIG. 4 shows modal delay vs. effective index for the BIMMF shown as square in FIG. 3. Star is the average modal delay for each principal mode group (PMG)
Figure 8:
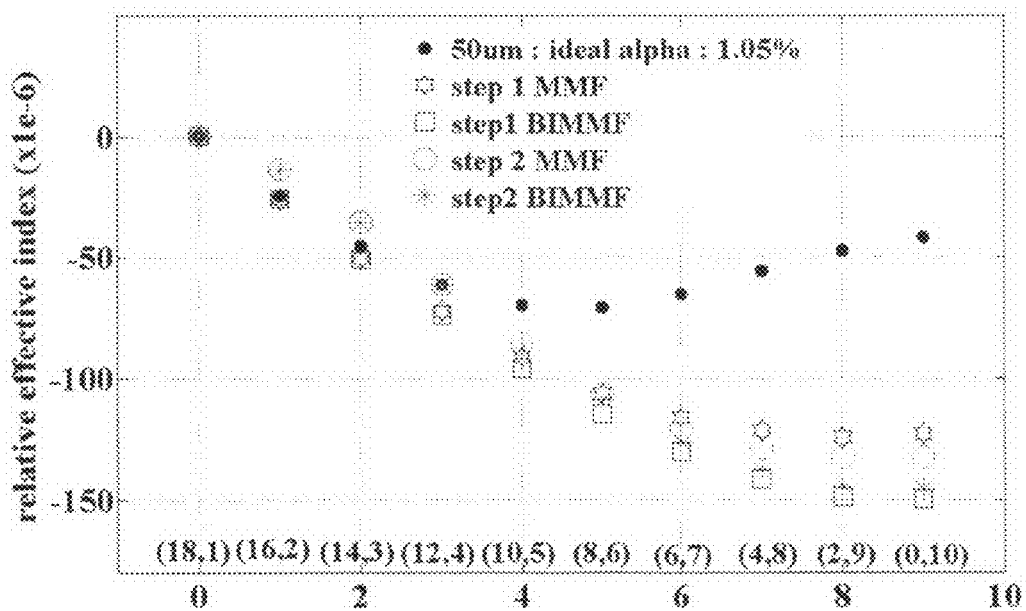
FIG. 8 is a plot of effective index difference of all modes zeroed by that of LP(18,1) in PMG 19 for two MMF with modified core with and without trench comparing to that of a conventional α-shape MMF.

FIG. 3 illustrates modal delay vs. effective index of all guided modes for a standard MMF without trench and three BIMMF as shown. Open circles stand for the standard MMF. Stars represent BIMMF with a trench of DN=−0.011 located at 5 μm away from the core edge. Open diamonds stand for BIMMF with a trench of DN=−0.011 adjacent to the core. Open squares represent BIMMF with a trench of DN=−0.011 located at 1.5 μm away from the core edge. As the trench moves closer to the core, the modal delays of low order principal mode group (larger neff-$n_{clad}$) don't show obvious change. However the modal delays of high order principal mode group change from negative to positive. The modal delays of all modes close to be equalized when the trench is located at 1.5 μm away from the core edge. As shown in FIG. 4, the variation of average modal delays of all principal mode groups for BIMMF consisting of a 1.05% delta, 50 μm core and trench ($DN_{tr}$=−0.011) positioned at 1.5 μm is less than 0.1 ps/m (max: 0.025 ps/m, min: −0.053 ps/m). There is an optimized trench position for different trench depth. The average modal delays of all principal mode groups is nearly equalized (less than 0.1 ps/m) for BIMMFs with trench DN/position of −0.003/0.68 μm, −0.005/1.05 μm, −0.007/1.25 μm and −0.011/1.5 μm, as shown in FIG. 8.

Figure 5:
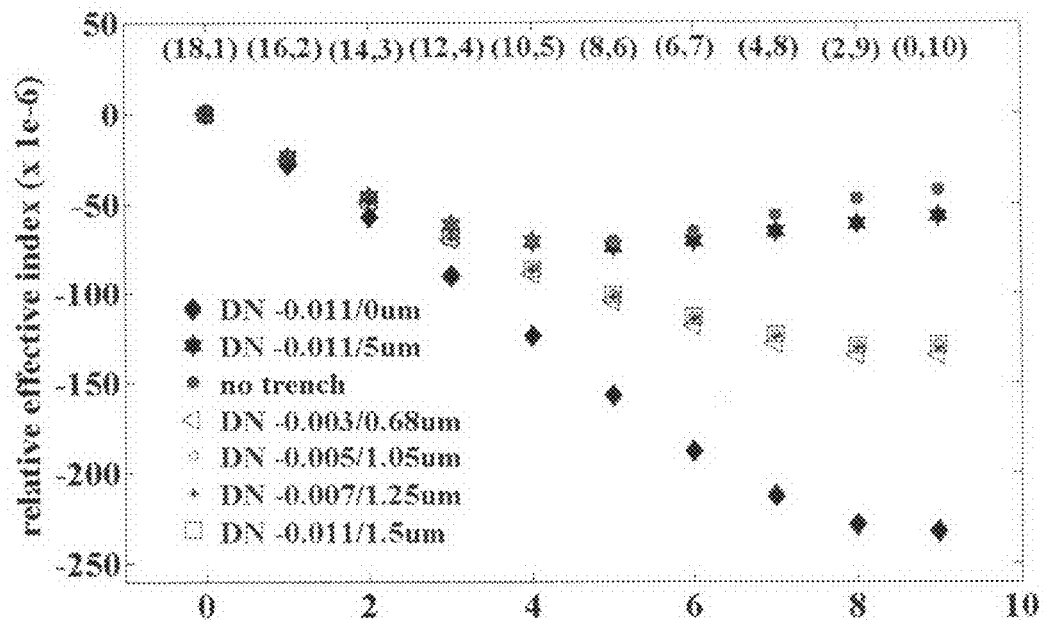
FIG. 5 shows effective index differences (1E−6) vs. modes for the PMG# 19 of 50 μm MMF, comparing various different fiber structures.
Figure 6:
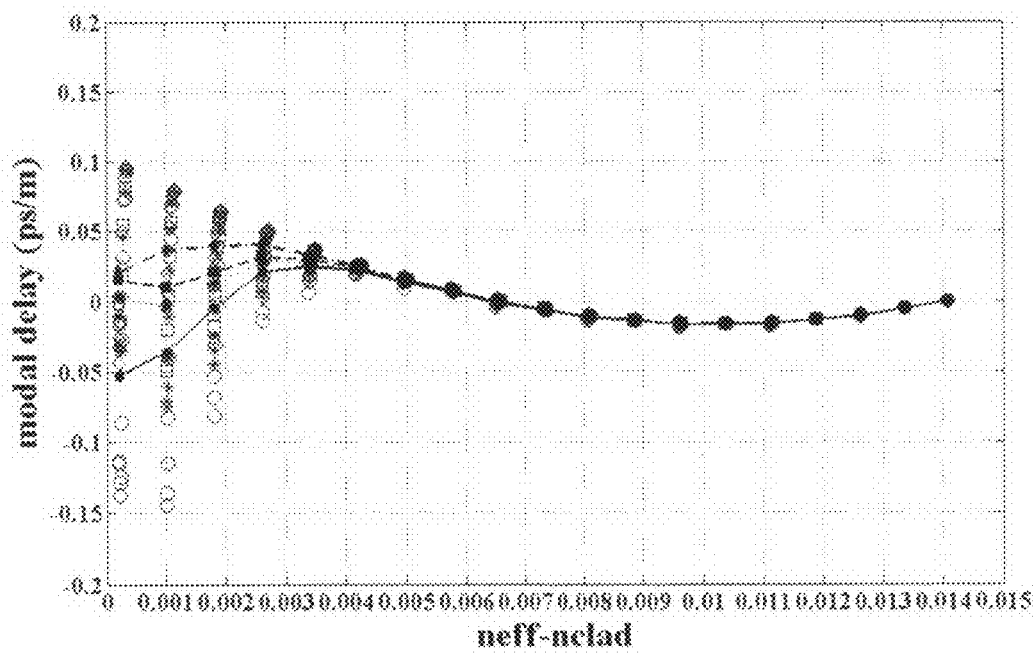
FIG. 6 illustrates modal delays of 50 μm MMF with 1.05% delta and trench. The black marks correspond to the designs with $DN_{tr}$ (refractive index difference of the trench) and position of the trench (−0.003/0.68 μm), (−0.005/1.05 μm), (−0.007/1.25 μm) and (−0.011/1.5 μm). Lines are average modal delay of each principal mode group.

FIG. 5 shows the effective index differences of 10 modes in principal mode groups for various trench parameters. The effective index differences are zeroed by that of LP(18,1). The modes are indicated on the top of the figure. When the effective index difference of 10 modes in PMG19 (from LP(18,1) to LP(0,10)) monotonically decreases in a range from 0 to −131+/−3 (×1e-6) (open triangle, open circle, star and open square), the average modal delays are nearly equalized as shown in FIG. 6. For the MMF with negative modal delay (fast) high order modes (e.g. solid circles standing for no trench MMF and solid star standing for BIMMF with trench $DN_{tr}$ −0.011 at 5 μm away from the core), the effective index differences of 10 modes in PMG 19 are above the optimized curve. For the MMF with the effective index difference of 10 modes in PMG 19 below the optimized curve (e.g. solid diamond for trench $DN_{tr}$ −0.011 adjacent to the core edge), the high order principal mode groups has positive modal delay or travel slower than low principal mode groups.

Same as the examples with core profile of 1.05% delta and 50 μm diameter, the modal delays of high order modes can be reduced for profiles with different diameter and delta. Design information for optical fibers having cores with different delta and diameter is given in the following table.

trench. For example, the relative effective index of those modes may be adjusted to be monotonically decreasing with its span between −134 (×1e−6) to −126 (×1e−6) for a 50 μm MMF with core delta of 1.05%. In addition to controlling trench parameters, the subtle modification of the core profile

TABLE 1

|  | fiber ID | core diameter (μm) | delta Δ | trench starting position r1 (μm) | trench DN | PMG # | min modal delay (ps/m) | max modal delay (ps/m) | relative Neff of the mode with lowest azimuthal mode #and highest radial mode # (x1E+316) |
|---|---|---|---|---|---|---|---|---|---|
| alpha profile without trench |  | 50 | 1.05% | 0 | 0 | 19 | −8.57 | 0.08 | −42 |
|  |  | 40 | 1.05% | 0 | 0 | 15 | −6.8 | 0.06 | −38 |
|  |  | 30 | 1.05% | 0 | 0 | 11 | −5.4 | 0 | −31 |
| BIMMF: alpha profile with trench | 1 | 50 | 1.05% | 1.50 | −0.011 | 19 | −0.14 | 0.09 | −129 |
|  | 2 | 50 | 1.05% | 0.68 | −0.003 | 19 | −0.048 | 0.095 | −135 |
|  | 3 | 50 | 1.05% | 1.05 | −0.005 | 19 | −0.038 | 0.09 | −129 |
|  | 4 | 50 | 1.05% | 1.25 | −0.007 | 19 | −0.055 | 0.075 | −131 |
|  | 5 | 50 | 1.05% | 1.5 | −0.011 | 19 | −0.14 | 0.09 | −129 |
|  | 6 | 40 | 1.05% | 1.5 | −0.011 | 15 | −0.03 | 0.085 | −126 |
|  | 7 | 30 | 1.05% | 1.3 | 0.011 | 11 | 0 | 0.1 | −120 |
| alpha profile without trench |  | 50 | 0.80% | 0 | 0 | 17 | −6.93 | 0.06 | −29 |
|  |  | 40 | 0.80% | 0 | 0 | 13 | −19.75 | 0.04 | −57 |
|  |  | 30 | 0.80% | 0 | 0 | 10 | −5.84 | 0 | 4 |
| BIMMF: alpha profile with trench | 8 | 50 | 0.80% | 1.7 | −0.011 | 17 | −0.07 | 0.08 | −106 |
|  | 9 | 40 | 0.80% | 1.5 | −0.011 | 13 | −0.01 | 0.07 | −100 |
|  | 10 | 30 | 0.80% | 1.3 | −0.011 | 10 | 0 | 0.12 | −96 |

Figure 7:
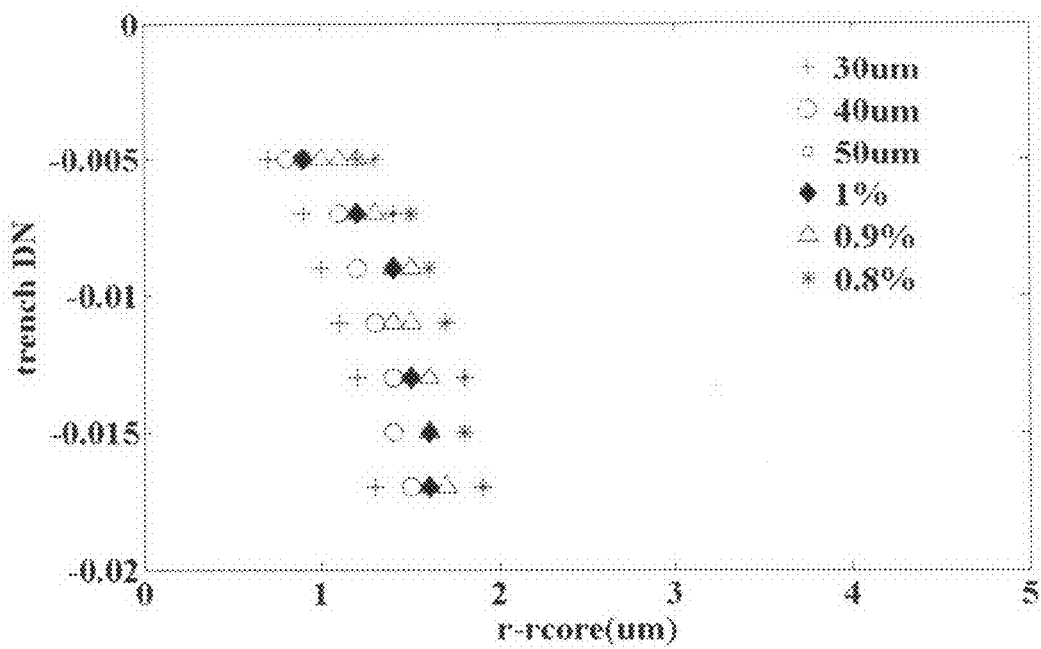
FIG. 7 is a plot of trench DN vs. radial starting position of trenches optimized for equalizing modal delay of high order modes.

As shown in Table 1, the modal delays are nearly equalized (indicated by minimum modal delay and maximum modal delay among all the modes in each design) for the design with the trench DN and position are optimized, for various designs with core diameter at 30 μm, 40 μm, 50 μm and delta at 1.05% and 0.8%. The effective index differences for the modes in highest principal mode group are 126 (×1e−6) and 120 (×1e−6) for BIMMF of core diameter of 40 μm and 30 μm with alpha shape and delta 1.05%. The effective index differences for the BIMMF with core delta reduced to 0.8% are between 96 (×1e−6) and 106 (×1e−6) for 30 μm, 40 μm, and 50 μm core diameters respectively. The optimized radial relation of the trench vs. trench DN is illustrated in FIG. 7. Five cases of core diameter and delta are presented: (50 μm, 1.05%), (40 μm, 1.05%), (30 μm, 1.05%), (50 μm, 1.05%), (50 μm, 0.9%), and (50 μm, 0.8%). The trench $DN_{tr}$ and $r_{tr1}$ position for most optimized modal delay of high order modes can be approximately fitted with a polynomial equation:

$$DN_{tr}=a_2(r_{tr1}-r_{core}-x_0)^2+a_1(r_{tr1}-r_{core}-x_0)+a_0 \qquad (3)$$

Where $a_2$ is in the range of −0.010 to −0.040, $a_1$ is in the range of −0.002 to −0.02, $a_0$ is in the range of −0.0045 to −0.0066 and $x_0$ takes the value in following table.

TABLE 2

Fitting parameters in equation (3)

| x0 (μm) | 1% | 0.90% | 0.80% |
|---|---|---|---|
| 30 | 0.7 | 0.85 | 0.85 |
| 40 | 0.85 | 1 | 1.05 |
| 50 | 0.9 | 1.1 | 1.25 |

It is shown above how the modal delay of high order modes is equalized by predetermined radial position and depth of the trench, especially the edge may effect high order mode equalization according to a second embodiment of the invention.

In this alternative embodiment, the fiber consists of four regions: (a') a modified α-shape core, (b') an annular region next to the core, (c') a trench with negative index next to the annular region, (d') a silica cladding next to the trench. An equation of the index profile for this embodiment can be described as:

$$\begin{aligned}
n(r) - n_{clad} &= \Delta\left(1 - \left(\frac{r}{r_{core}}\right)^a\right) \cdot n_{clad} + J & \text{for } r \leq r_0 \\
&= \Delta\left(1 - \left(\frac{r}{r_{core}}\right)^a\right) \cdot n_{clad} + J + \frac{m \times (r - r_0)}{r_{core} - r_0} & \text{for } r_0 < r \leq r_{core} \\
&= \Delta_1 \cdot n_{clad} & \text{for } r_{core} < r \leq r_{tr1} \\
&= \Delta_2 \cdot n_{clad} & \text{for } r_{tr1} < r \leq r_{tr2} \\
&= 0 & \text{for } r \geq r_{tr2}
\end{aligned} \qquad (4)$$

where n(r) is the absolute refractive index at radial position r, $n_{clad}$ is the absolute refractive index of the cladding, r is the radial position; $r_{core}$ is the radius, α preferably has a value of 1.9 to 2.2; J is a step index correction term with value between 0 to 0.002; m is the slope coefficient of a linear index correction term with value between 0 to 0.00025 (0.0001 to 0.0002 in table 3); and $r_0$ is starting radial position of the linear correction term with value $\geq 80$ $r_{core}$. $\Delta_2 \cdot n_{clad}$ is also denoted as the trench DN or $DN_{tr}$.

As shown in eqs. 4, the core profile with the core edge modification is essentially a hybrid of an alpha index core and a step index core. Table 3 shows three examples of BIMMF with core profile being modified as equation (4). Two has the designs-without the trench as comparison. The BIMMF design denoted as step BIMMF F1 has step index parameter J=0.00155 and linear correction parameter m=0.0001. The average modal delay max/min is 0.081/−0.909 ps/m without trench feature. The average modal delay max/min is 0.146/−0.012 ps/m with trench DN=−0.011 at 3.5 μm away from core edge. The BIMMF design denoted as step BIMMF F2 has step index parameter J=0.00185 and linear correction parameter m=0.0002. The average modal delay max/min is 0.249/−0.265 ps/m without a trench feature and 0.277/−0.11 ps/m with a trench DN=−0.011 at 6 μm away from the core edge. The BIMMF design denoted as step BIMMF F3 has step index parameter J=0.0013 and linear correction parameter m=0.0001. The average modal delay max/min is 0.049/−0.206 ps/m. FIG. 8 shows the effective index difference of 10 modes in principal mode group 19 of two modified designs w/ and w/o a trench. The effective index difference are monotonically decreasing. The difference between the effective index of LP(18,1) and LP(0,10) are −123 (×1e-6), −133 (×1e-6), −145 (×1e-6), −136 (×1e-6) for example 1 (denoted as step F1 without trench, step BIMMF F1 with trench) and example 2 (denoted as step F2 without trench, step BIMMF F2 with trench). The following table gives parameters for the optical fiber designs in FIGS. 8-10.

The modal delay of high order modes can be further optimized by increasing leakage loss of all mode or some modes of two highest order principal mode groups by moving down the core region, as illustrated in following equation:

$$n(r) - n_{clad} = DN_{core}\left(1 - \left(\frac{r}{r_{core}}\right)^a\right) + DN_1 \quad \text{for } r \leq r_0 \quad (5)$$
$$= DN_1 \quad \text{for } r_0 < r \leq r_{tr1}$$
$$= DN_{tr} \quad \text{for } r_{tr1} < r \leq r_{tr2}$$
$$= 0 \quad \text{for } r \geq r_{tr2}$$

where n(r) is the absolute refractive index at radial position r, $n_{clad}$ is the absolute refractive index of the cladding, r is radial position, $r_0$ is the edge of the core, $r_{core}$ is radius of a norminal Δ-shape profile, α preferably has α value of 1.9 to 2.2, $DN_{tr}$ is the depressed shoulder index, $DN_{tr}$ is the trench index, $r_{tr1}$ is the inner radius of the trench and $n_{tr2}$ is the outer radius of the trench. $r_0$ is within $r_{core}$ −0.5 to $r_{core}$ −2.0 in units of μm (or 0.92 to 0.98 $r_{core}$). $DN_1$ is less than the cladding index, pref-

TABLE 3

| | core radius (μm) | delta Δ | trench starting position from core edge (μm) | trench DN | r0 (μm) | J | m | PMG # | min mdel (ps/m) | max mdel (ps/m) | min average modal delay (ps/m) | max average modal delay (ps/m) | relative Neff of the mode with lowest azimuthal mode # and highest radial mode # (x 1F.6) |
|---|---|---|---|---|---|---|---|---|---|---|---|---|---|
| step F1 | 24 | 0.00974 | 0 | 0 | 22 | 0.00155 | 0.0001 | 19 | −2.8 | 0.17 | −0.909 | 0.081 | −123 |
| step BIMMF F1 | 24 | 0.00974 | 3.5 | −0.011 | 22 | 0.00155 | 0.0001 | 19 | −0.26 | 0.19 | −0.012 | 0.146 | −146 |
| step F2 | 24 | 0.00920 | 0 | 0 | 20 | 0.00185 | 0.00022 | 19 | −1.6 | 0.6 | −0.265 | 0.249 | −133 |
| step BIMMF F2 | 24 | 0.00920 | 6 | −0.011 | 20 | 0.00185 | 0.00022 | 19 | −0.6 | 0.5 | −0.110 | 0.277 | −138 |
| step BIMMF F3 | 24 | 0.00974 | 2.6 | −0.004 | 22 | 13 | 0.0001 | 19 | −0.64 | 0.11 | −0.206 | 0.049 | −132 |

Figure 9:
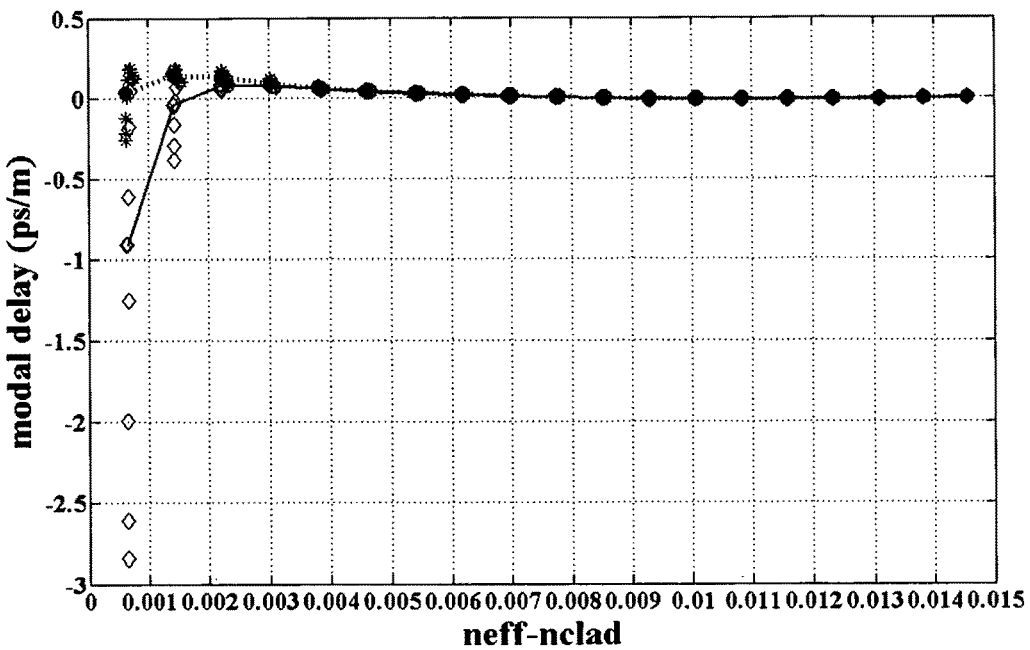
FIG. 9 shows modal delays of all modes for fiber step F1 (open black diamond) and step BIMMF1 (black star). The lines indicate average modal delay for each PMG.
Figure 10:
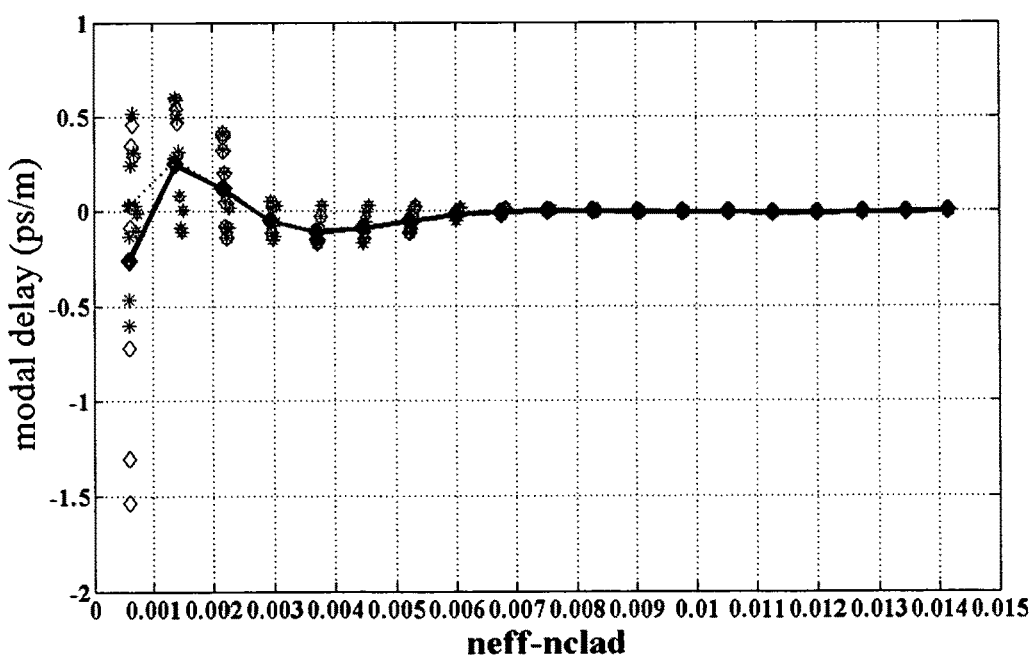
FIG. 10 shows modal delays of all modes for fiber step F2 (open black diamond) and step BIMMF2 (black star). The lines indicate average modal delay for each PMG.

FIG. 9 shows the modal delay for the optical fibers step F1 and step BIMMF F1. FIG. 10 shows the modal delay for the optical fiber step F2 and step BIMMF F2. The trench position in said examples is located at 3.5 μm (step BIMMF1) and 6 μm (step BIMMF2) away from the core edge. This indicates that the modification of core edge feature enables moving the trench outward radially, while maintaining small modal delay spreading for high order mode groups. The trench depth vs. its radial position follows similar relation as in table 2 and equation (4) except the $x_0$ would be larger.

Figure 11:
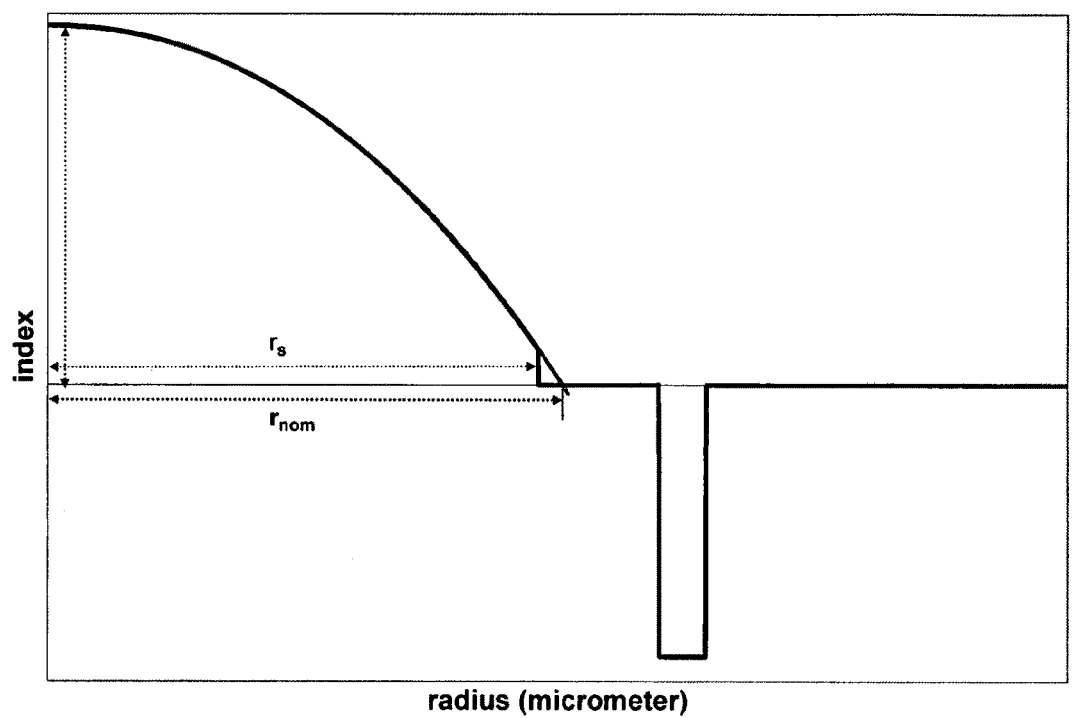
FIG. 11 is a representation of a core edge modification according to a second embodiment of the invention.

FIG. 11 index profile is a schematic representation of a core profile modification of the invention where the dashed curve part of the profile represents an approximate alpha profile and the vertical step at the edge of the core profile, at position $r_s$, represents the step. The dashed line that continues to $r_{nom}$ is the nominal index profile in this region for an alpha profile core. One recommendation for realizing the benefits of this embodiment of the invention is the step forming the core edge modification should have a height of 0.05 to 0.155 (0.1 to 0.155 in table 3) of the maximum center core index height and a position $r_s$ between 0.92 and 0.98 of $r_{nom}$.

erably in a range of 0 to −0.002. $r_{tr1}$ is larger than $r_{core}$+2 μm, and $r_{tr2}$ is larger than $r_{tr1}$+2 μm.

Figure 12:
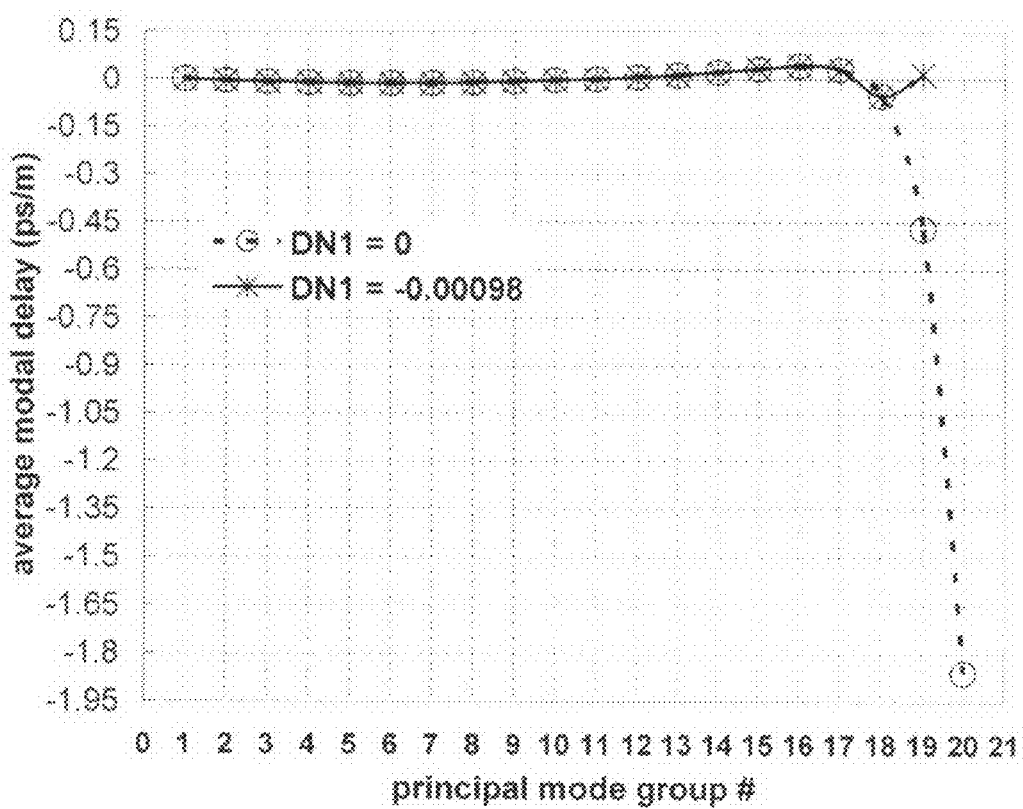
FIG. 12 shows the average modal delays of all principal mode groups of two examples in equations 5.

When $r_{tr1}$ is large enough, the modal delay structure is primarily determined by core parameters alpha, $DN_{core}$, $r_0$, and $r_{core}$, and the number of guided PMG is mediated by $DN_1$. As an example, FIG. 12 shows the average modal delays of two designs of equations 5. The two designs have $DN_{core}$=0.01407, $r_{core}$=27 μm, $r_0$=26 μm, $DN_{tr}$=−0.006, $r_{tr1}$=34 μm, $r_{tr2}$=38 μm. The first design example has $DN_1$=0 and the second design example has $DN_1$=−0.00098. The second design is essentially the first design with core and first cladding index shifted down by $DN_1$. The modal delays of PMG from 1 to 18 are the same for designs with DN=0 and $DN_1$=−0.00098, which clearly shows that modal delay structure is determined by the core and shoulder design features. PMG# 19 and PMG# 20 are two high order principal mode groups with modal delays deviated from optimum for design with $DN_1$=0. PMG # 20 is no longer guided with $DN_1$=−0.00098. Modes with low azimuthal mode numbers also become leaky modes. Only half modes with high azimuthal mode numbers

TABLE 4

| example ID | DMD (ps/m) MW23 | DMD (ps/m) MW18 | centroid modal delay (ps/m) max | centroid modal delay (ps/m) min | average modal delay (ps/m) max | average modal delay (ps/m) min | 3dB BW GHz. (km) EMBc |
|---|---|---|---|---|---|---|---|
| table I-1 | 0.071 | 0.045 | 0.008 | −0.029 | 0.025 | −0.053 | 21 |
| table I-2 | 0.051 | 0.045 | 0.031 | −0.001 | 0.041 | −0.016 | 21 |
| table I-3 | 0.040 | 0.035 | 0.021 | −0.001 | 0.032 | −0.016 | 27 |
| table I-4 | 0.035 | 0.035 | 0.016 | −0.001 | 0.029 | −0.016 | 29 |
| table I-8 | 0.030 | 0.025 | 0.011 | 0.000 | 0.029 | −0.007 | 36 |
| table I-9 | 0.020 | 0.020 | 0.011 | 0.000 | 0.025 | −0.004 | 47 |
| step BIMMF F1 | 0.152 | 0.126 | 0.071 | −0.001 | 0.146 | −0.012 | 9 |
| step BIMMF F3 | 0.237 | 0.051 | 0.010 | −0.108 | 0.049 | −0.206 | 19 |
| example in FIG 16 | 0.076 | 0.045 | 0.015 | −0.008 | 0.043 | −0.053 | 19 | are guided, which changes the average modal delays of PMG# 19. As the result, the spread of the average modal delays of guided modes of the second design is greatly reduced, with max-min <0.1 ps/m. Table 4 shows the simulated DMD (differential modal delay), centroid modal delay, average modal delay and 3 dB effective modal bandwidth for some BOMMF examples in Table 1, Table 3 and $DN_1=-0.00098$ in FIG. 12.

Figure 13:
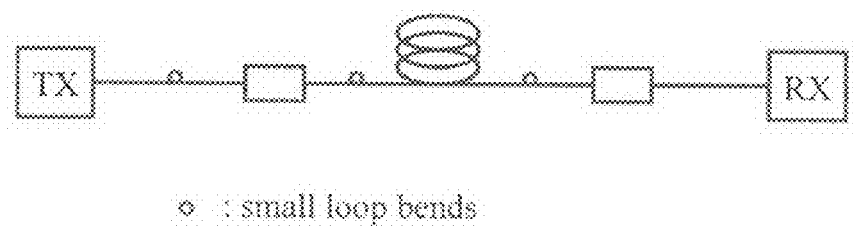
FIG. 13 is a schematic representation of a high speed transmission link layout.

FIG. 13 is a schematic representation of a transmission link using the optical fiber designs described earlier. The bit error rate (BER) waterfall curves are measured using a commercial available 10 Gbps-SR transceiver over a 550 m example fiber without bends and with 10 loops small bends of diameter 5 mm, 10 mm and 15 mm. 10 Gbps-SR transceiver consists of a 10.3125 Gbps transmitter made of 850 nm VCSEL. The dispersion power penalty (defined as the difference of stressed receiver sensitivity between back to back link and fiber under test link at BER=1E−12) is less than 2 dB for all cases. The bending loss for 10 loops bends in the transmission link is 0.26 dB, 0.01 dB and 0.01 dB at bending diameters of 5 mm, 10 mm and 15 mm, respectively. Error free (defined as BER<1E−12) transmission is also achieved over a 771 m example fiber with a commercial 10 Gbps-SR transceiver. The bending loss of another example fiber with trench DN −0.011 and thickness 10 μm coupling to a 10.3125 Gbps VCSEL is only 0.068 dB for 10 loops of 5 mm bending diameter.

The objective of equalized modal delays for all guided modes with effective index larger than the refractive index of region the outer cladding, i.e., that of silica, may not in practice be realized precisely but in any practical optical fiber design the goal of equalizing modal delays will be evident, and that property should be so construed.

In concluding the detailed description, it should be noted that it will be obvious to those skilled in the art that many variations and modifications may be made to the preferred embodiment without substantial departure from the principles of the present invention. All such variations, modifications and equivalents are intended to be included herein as being within the scope of the present invention, as set forth in the following claims.

The invention claimed is:

1. A multi-mode optical fiber comprising in cross section:
   a. a core with a material having a predetermined refractive index
   b. a first cladding surrounding and in contact with the core, the first cladding having a refractive index less than that of the core,
   c. a second cladding surrounding the first cladding the second cladding having a refractive index less than that of the first cladding,
   d. a third cladding surrounding the second cladding the third cladding having a refractive index approximately that of silica,
   the optical fiber having:
      near equalized modal delays for all guided modes with effective index larger than the refractive index of cladding d, and
      bending loss less than 0.1 dB/turn with ≦10 mm bending diameter and less than 0.3 dB/turn with ≦5 mm bending diameter when coupled to a 10 Gigibit or higher bit rate VCSEL at 850 nm,
   the optical fiber having the refractive index profile:

$$\frac{n(r) - n_{clad}}{n_{clad}} = \Delta\left(1 - \left(\frac{r}{r_{core}}\right)^a\right) \quad \text{for } r \leq r_0 \leq r_{core}$$
$$= \Delta_1 \quad \text{for } r_0 < r \leq r_{tr1}$$
$$= \Delta_2 \quad \text{for } r_{tr1} < r \leq r_{tr2}$$
$$= 0 \quad \text{for } r \geq r_{tr2}$$

where n(r) is absolute refractive index at radial position r, $n_{clad}$ is absolute refractive index of cladding, r is radial position, $\Delta$, $\Delta_1$, $\Delta_2$ are relative index difference and $r_{core}$ is core radius, and α preferably has a value of 1.9 to 2.2.

2. The multi-mode optical fiber of claim 1 wherein the core has a refractive index with an inner region having an essentially alpha profile, and an outer region having a step profile.

3. The multi-mode optical fiber of claim 2 wherein the inner cladding has a radial width w, and the combination of the width of the inner cladding and the refractive index of the second cladding are configured so that the modal delay of higher guided principle mode group is increased, and equalized to that of the medium and lower guided principle mode group.

4. An optical fiber subsystem comprising the optical fiber of claim 1 coupled to a vertical cavity surface-emitting laser.

5. A multi-mode optical fiber, the optical fiber comprising four regions:
   a. a modified α-shape core with the edge being modified,
   b. an annular silica region next to the core,
   c. a trench with negative refractive index next to the annular region,
   d. a silica cladding next to the trench,
   the refractive index profile of the four regions having:

$$n(r) - n_{clad} = \Delta\left(1 - \left(\frac{r}{r_{core}}\right)^a\right) \cdot n_{clad} + J \quad \text{for } r \leq r_0$$
$$= \Delta\left(1 - \left(\frac{r}{r_{core}}\right)^a\right) \cdot n_{clad} + J + \frac{m \times (r - r_0)}{r_{core} - r_0} \quad \text{for } r_0 < r < r_{core}$$
$$= \Delta_1 \cdot n_{clad} \quad \text{for } r_{core} < r \leq r_{tr1}$$
$$= \Delta_2 \cdot n_{clad} \quad \text{for } r_{tr1} < r \leq r_{tr2}$$
$$= 0 \quad \text{for } r \geq r_{tr2}$$

where n(r) is absolute refractive index at radial position r, $n_{clad}$ is absolute refractive index of cladding, r is radial position, $\Delta$, $\Delta_1$, $\Delta_2$ are relative index difference and $r_{core}$ is core radius, and $\alpha$, J and m are the core shape, the said multimode optical fiber having near equalized modal delays for all guided modes with effective index larger than the refractive index of region d.

6. The multimode optical fiber of claim 5 with a bending loss less than 0.1 dB/turn with <=10 mm bending diameter and less than 0.3 dB/turn with <=5 mm bending diameter when coupled to 10 Gigibit or higher bit rate VCSEL at 850 nm.

7. The multimode optical fiber of claim 6 with a bending loss less than 0.01 dB/turn.

8. The multimode optical fiber of claim 5 with 0<J<0.0025.

9. The multimode optical fiber of claim 5 where $\alpha$ has a value of 1.9 to 2.2.

10. The multimode optical fiber of claim 5 with $0 >= \Delta_1 >= -0.02\%$.

11. The multimode optical fiber of claim 5 with $1.1\% >= \Delta >= 0.8\%$.

12. The multimode optical fiber of claim 5 with $-0.004 >= \Delta_2 \cdot n_{clad} >= -0.011$.

13. The multimode optical fiber of claim 5 with $0 <= m <= 0.0002$.

14. The multimode optical fiber of claim 5 with $r_{core} - 4 <= r_0 <= r_{core} - 1$.

15. The multimode optical fiber of claim 5 where $$\Delta_2 \cdot n_{clad} = a_2(r_{tr1} - r_{core} - x_0)^2 + a_1(r_{tr1} - r_{core} - x_0) + a_0$$

and where $a_2$ is in the range of −0.010 to −0.040, $a_1$ is in the range of −0.002 to −0.02, $a_0$ is in the range of −0.0045 to −0.0066.

16. A system comprising:
a) a high speed laser transmitter,
b) a high speed optical receiver,
c) the multimode optical fiber of claim 1 coupled between the transmitter and receiver.

17. A system comprising:
a) a high speed laser transmitter,
b) a high speed optical receiver,
c) the multimode optical fiber of claim 5 coupled between the transmitter and receiver.

18. The system of claim 17 wherein the optical fiber includes at least one curved fiber segment having a bend radius 2-7.5 mm, capable of a bit error rate $<10^{-12}$ transmission over 550 m at a bit rate 10.3125 Gbps at around 850 nm.

19. A multi-mode optical fiber comprising in cross section:
a. a core with a material having a predetermined refractive index
b. a first cladding surrounding and in contact with the core, the first cladding having a refractive index less than that of the core,
c. a second cladding surrounding the first cladding the second cladding having a refractive index less than that of the first cladding,
d. a third cladding surrounding the second cladding the third cladding having a refractive index approximately that of silica, the optical fiber characterized in that the core has a first portion with an alpha refractive index profile nominally extending to $r_{nom}$ and a second portion with a step index profile at the edge of the core profile at position $r_s$, where the first portion of the core has maximum refractive index $n_{max}$ and the second portion of the core has a maximum refractive index in the range 0.05 $n_m$ to 0.155 $n_m$ and a position $r_s$ between 0.92 and 0.98 of $r_{nom}$.

* * * * *